Feb. 17, 1942.   E. G. BUSSE   2,273,623
BRAKE BEAM STRUCTURE
Filed July 28, 1941   2 Sheets-Sheet 1

INVENTOR.
EDWIN G. BUSSE
BY Rodney Bedell
ATTORNEY.

Feb. 17, 1942.  E. G. BUSSE  2,273,623
BRAKE BEAM STRUCTURE
Filed July 28, 1941  2 Sheets-Sheet 2

INVENTOR.
EDWIN G. BUSSE
BY
ATTORNEY.

Patented Feb. 17, 1942

2,273,623

UNITED STATES PATENT OFFICE 2,273,623

BRAKE BEAM STRUCTURE

Edwin G. Busse, Chicago, Ill., assignor to Chicago Railway Equipment Company, Chicago, Ill., a corporation of Illinois Application July 28, 1941, Serial No. 404,313

15 Claims. (Cl. 188—222)

The invention relates to truss type brake beams as used on railway rolling stock and consists in all of the novel subject matter disclosed in this application and particularly in the strut and its association with the compression member of the beam.

It has been customary to hold the strut against movement lengthwise of the beam compression member by providing a hole in the back of the beam for receiving a lug or tongue on the opposing portion of the strut. This practice is objectionable, particularly when the compression member is made of high carbon steel, as there is a tendency for the fatigue of the beam to concentrate on a line with the punched hole, and this, combined with cambering of the beam, increases the beam's tendency to break.

One object of the invention is to hold the strut and the beam compression member against relative movement lengthwise of the compression member without requiring an aperture in the compression member. This object is accomplished by providing a thrust-receiving element of non-metallic material between opposing faces of the strut and compression member and utilizing the resulting increased friction between these parts to attain the desired object.

Another object is to utilize such a friction holding means in connection with a one-piece "reversible" type strut, that is, a strut which may be rotated in the general plane of the beam to accommodate a lever inclined to one side of a perpendicular to the beam or a lever inclined at the opposite side to the perpendicular. This object is attained by providing the strut with a seat for the friction thrust-receiving element, the seat being rotatably but non-slidably mounted on the strut.

Another object is to provide an interchangeable strut which may be applied to a compression member of the so-called "channel" section compression member having a flat web between its horizontal flanges, or to a U section compression member in which the horizontal flanges are connected by an arcuate web. Both types of compression members are in general use and, for a given size or capacity of brake beam, the depth of the channel section member, or the distance between its flanges, is greater than the depth of the U section member, or the distance between its flanges. Accordingly the portion of an interchangeable reversible strut which seats the beam compression member must be arranged to limit the rotation of the strut in the plane of the beam irrespective of the type of compression member to which it is applied.

This object is attained by providing the strut with rotation limiting elements for engaging the outer faces of the flanges of a channel section compression member and with rotation limiting elements for engaging the inner faces of the flanges of a U section compression member, the elements for limiting the rotation of the strut when applied to one type of beam member being arranged so as to avoid interference with the rotation of the strut when applied to the other type of beam member.

These and other detailed objects of the invention as will appear from the following description are attained by the structures illustrated in the accompanying drawings illustrating selective embodiments of the invention in which—

Figures 4, 5, 6:
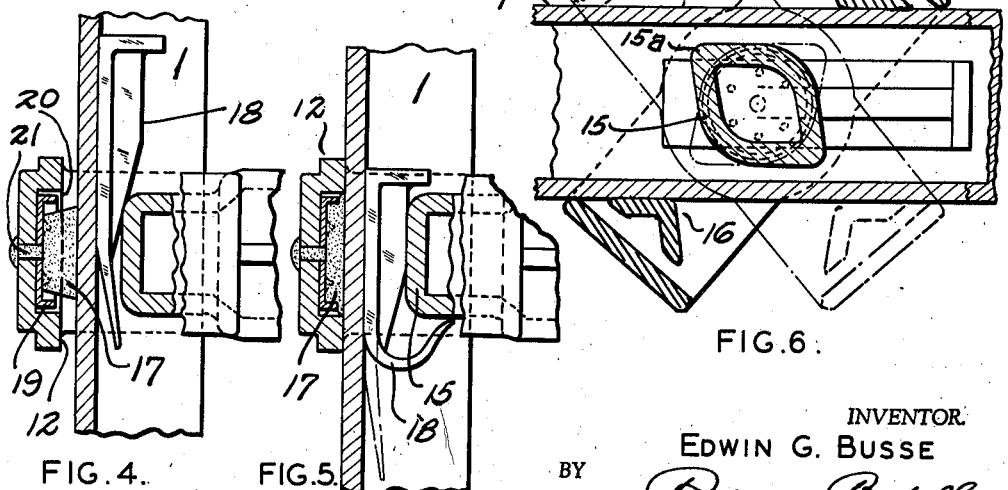
Figure 4 is a horizontal section taken on the line 4—4 of Figure 3.
Figure 5 shows the same parts after their holding means has been tightened.
Figure 6 is a vertical section taken on the line 6—6 of Figure 3.
Figure 7:
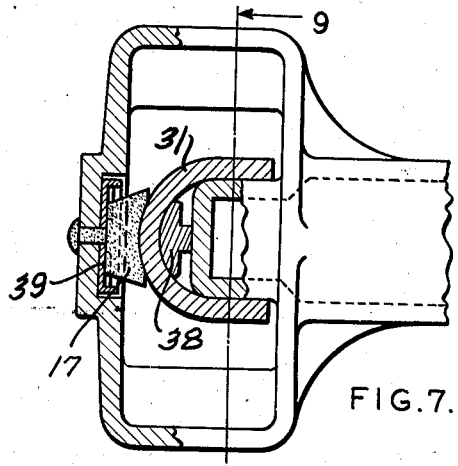
Figure 8:
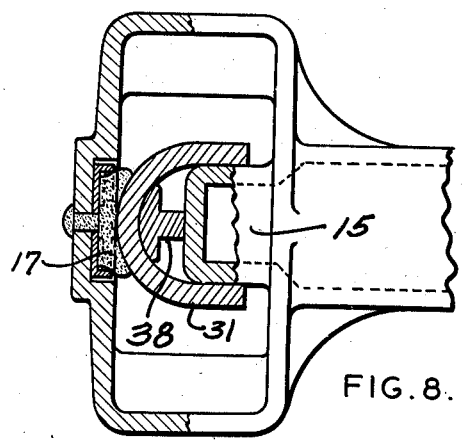
Figure 9:
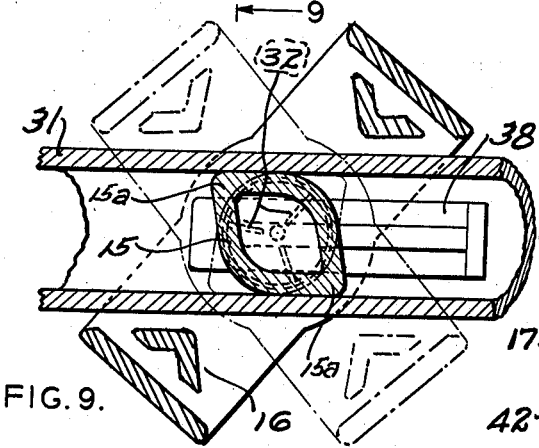

Figures 7, 8 and 9 correspond to Figures 4, 5 and 6 but show the assembly of a strut of a U section compression member.

Figure 10:
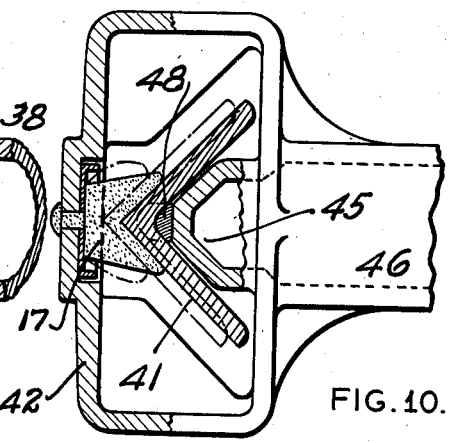
Figure 11:
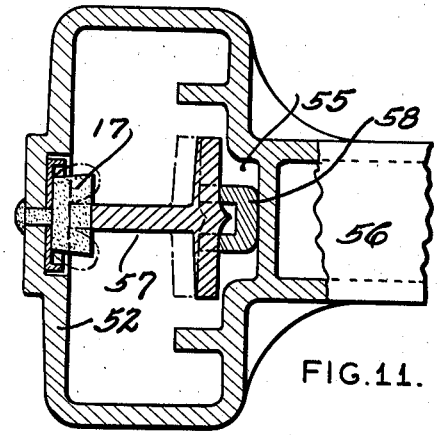

Figures 10 and 11 correspond to Figures 4 and 7 but show the strut assembled with an "angle" section compression member and a T section compression member respectively, the position of the beam in the strut, when the assembly is tightened, being indicated in broken lines.

Figure 12:
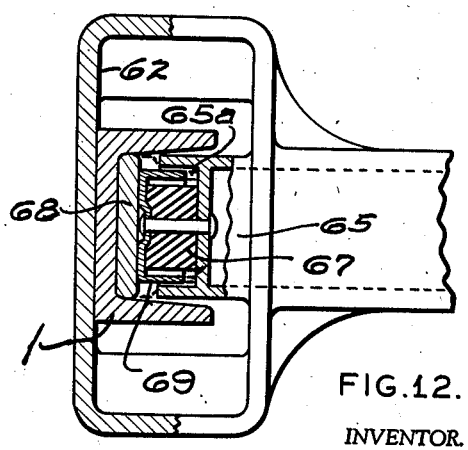

Figure 12 illustrates another form of the invention embodying the application of a strut to a channel section compression member.

Figure 1:
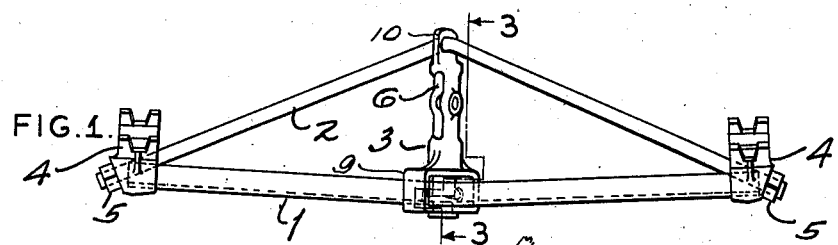
Figure 1 is a plan view of a truss type brake beam of the general type referred to above.
Figure 2:
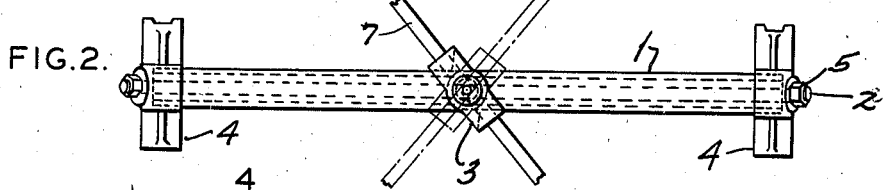
Figure 2 is an elevation looking at the back of the beam and showing a beam operating lever.

The complete beam shown in Figures 1 and 2 includes a compression member 1, a tension member 2, a strut 3, brake heads 4 seated on the ends of compression member 1 and providing seats for the nuts 5 threaded on the ends of tension member 2 and through which the beam is provided with its initial tension.

The strut includes a slot 6 for receiving a brake lever 7 which usually is inclined at an angle of 40° to the perpendicular to accommodate the extension of the pull rod, not shown, at the side of the center plate of the truck on which the beam is mounted while permitting the lever to apply thrust to the beam at the center of the truck.

Preferably the strut is of one-piece rigid casting including a substantially hollow tubular body 8 with transverse loop portions 9 and 10 at its ends for receiving the beam compression member 1 and tension member 2 respectively. Loop portion 9 includes front and rear walls 11 and 12 and top and bottom walls 13 and 14 respectively, wall 12 opposing the outer or rear face of the beam webb and wall 11 opposing the edges of the flanges of the beam compression member and being provided with a boss or projection 15 extending between the flanges and with its end opposing the inner or front face of the beam web.

Cooperating with the edges of the top and bottom walls of the loop are elements 16 disposed to engage the outer faces of the flanges of the compression member when the strut is rotated in the plane of the beam to position the brake lever 7 at the 40° inclination to the plane of the beam referred to above.

Between the loop rear wall 12 and the rear face of the compression member there is an insert 17 of non-metallic, readily distortable material, such as rubber for example, and between the end of boss 15 and the opposing inner face of the compression member there is a wedge 18 adapted to be driven from the position shown in Figure 4 to the position shown in Figure 5 in which insert 17 is distorted as indicated, permitting the back of the compression member to seat against the opposing face of the loop wall.

Due to the fact that parts of rubber and steel will not slip over each other, particularly when under substantial pressure, the strut is held to its position intermediate the ends of the compression member, and the desired relation between the parts will not be changed because of the application and release of the brakes or because of jars in the operation of the truck or rough handling of the beam during its individual shipment or its application to or removal from the truck.

To facilitate rotation of the strut in the plane of the beam without loosening wedge 18, insert 17 is provided with a cap 19 of metal bearing against the inner face of loop wall 12 and preferably the cap is of circular contour and is seated in a circular recess 20 in wall 12. The lesser friction between the opposing metal faces of the cap and the wall, as against the greater frictional resistance between rubber pad and metal cap, will accommodate their relative rotation and the movement of the strut from the solid line position shown in Figure 6 to the dotted line position without disturbing the position of strut lengthwise of compression member.

Preferably insert 17 is provided with a headed shank 21 to maintain the assembly of the insert, with its cap 19, and the loop wall when the strut is not assembled with the compression member. Preferably the rubber opposing face of cap 19 is provided with projections 22 to keep the cap from swiveling on the rubber insert if there were any tendency for such relative movement.

Figures 7, 8 and 9 show the same strut applied to a U section compression member 31, the only different element of the assembly being the key 38 which has its compression member engaging surface curved instead of flat. When this key is driven home, it forces the rear wall of the section against the opposing wall of the loop, at the same time distorting the rubber insert as indicated to hold the strut against sliding movement along the beam compression member.

Figure 3:
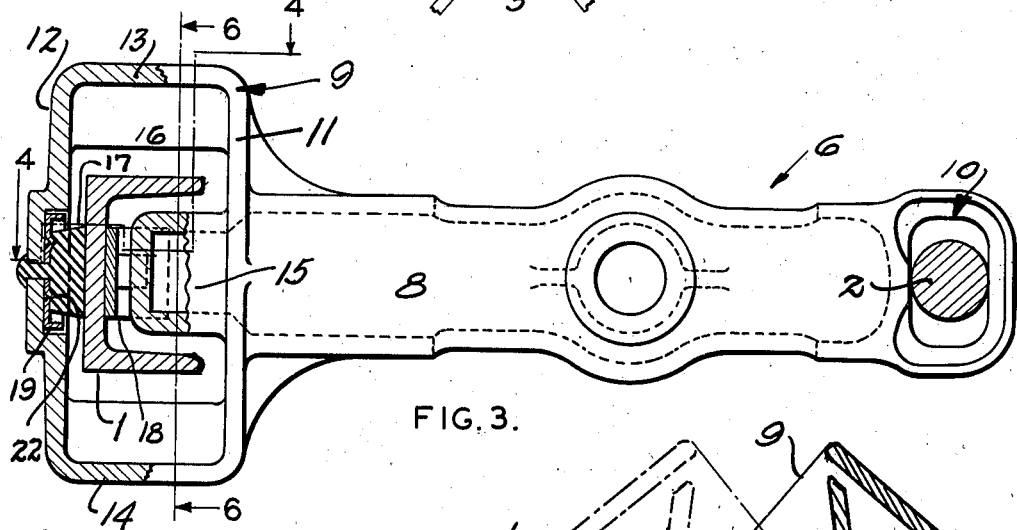
Figure 3 is a section taken on the line 3—3 of Figure 1 but drawn to an enlarged scale and illustrating the construction of the strut and its assembly with a channel section beam compression member before the parts are secured in their final relations to each other.

In this assembly the V-shaped corners 15a at diametrically opposite sides of boss 15 are shaped to contact the inner faces of the compression member flanges, as best shown in Figure 9, to limit the rotation of the strut in the plane of the beam to the 40° inclination from the perpendicular. Since the over-all depth of member 31 is less than the over-all depth of a corresponding channel member, as shown at 1 in Figure 3, the strut elements 16 would not contact the flanges of the U section compression member when the strut is rotated 40° from the perpendicular, hence the shaping of boss 15 for this purpose.

It will be noted that elements 16 do not interfere with the rotation of the strut between the full line and dotted line positions indicated in Figure 9, when the strut is assembled with a U section compression member, nor do the V-shaped corners 15a of the boss interfere with the rotation of the strut between the full line and dotted line positions indicated in Figure 6, when the strut is assembled with a channel section compression member. Cap 39 is shown with radial ribs 32, in place of projections 22, for securing the rubber insert 17 against movement in the cap.

Figure 10 illustrates a modified strut 46 adapted particularly to receive a compression member 41 of angle section, and the strut boss 45 and cooperating wedge 48 have their contours modified to complement the opposing faces of the angle legs. The essential feature of the distortable, non-metallic insert 17 between the back of the beam compression member and the opposing wall 42 of the strut loop is substantially the same as previously described.

Figure 11 shows a strut 56 arranged to receive a beam compression member 57 of T section and this results in the provision of a recess 55, in place of the bosses 15 and 45 previously described, and in the provision of a modified form of wedge 58 for thrusting the T section against the inner face of the loop rear wall 52 with the resulting distortion of the rubber insert 17.

Figure 12 shows another form of the invention in which the compression member 1 of channel section is seated directly against the rear wall 62 of the strut loop and the strut boss 65 has a recess 65a receiving the rubber insert 67, and the latter is provided with a cap 69 bearing against the wedge 68 driven between the cap and the inner face of the channel compression member.

As in the other forms of the invention, the distortion of the rubber insert holds the strut loop against movement lengthwise of the beam compression member. The circular contours of the rubber insert, its spring cap and the recess 65a accommodate the rotation of the strut in the plane of the beam to accommodate a left hand or right hand inclination of the brake lever.

It will be understood that the positions of the parts shown in full lines in Figures 10, 11 and 12 are those assumed by the strut and compression member in the initial assembly of the parts and that after the wedge is driven tight there will be direct contact between the compression member and the back wall of the loop as indicated by broken lines and corresponding to that indicated in Figures 5 and 8. In other words, while the rubber element is distorted sufficiently to produce the desired frictional resistance to sliding movement of the strut along the beam, it is not relied upon to transmit the thrust between the compression and tension members of the beam. This thrust is transmitted through the rigid strut in the usual manner.

The details of the construction may be varied and some of the features described may be omitted without departing from the spirit of the invention, and the exclusive use of such modifications of the structure as come within the scope of the claims is contemplated.

What is claimed is:

1. In a truss type brake beam, a strut part, a brake beam compression member part, a device for thrusting said parts into engagement with each other, and an element of non-metallic yielding material subjected to pressure by said device and engaging one of said parts to resist the sliding movement of the latter over the other part.

2. A brake beam as described in claim 1 in which the non-metallic element is provided with a cup-like metallic cap and one of the parts is provided with a recess receiving said cap and holding it against movement longitudinally of the recess part but providing for rotation of the cap and element on the part to accommodate reversal of the strut to lever inclining positions at opposite sides of a perpendicular to the beam.

3. In a truss type brake beam, a strut part, a beam compression member part, a device for thrusting said parts into contact with each other, and an element of non-metallic material between said parts and distorted by the action of said device and holding said parts against sliding movement over each other.

4. A brake beam assembly as described in claim 3 in which one of the opposing faces of the strut part and the compression member part includes a recess receiving the non-metallic element, the cross sectional area of said recess being substantially greater than the cross sectional area of said element and accommodating its distortion as the parts are thrust towards each other.

5. A brake beam as described in claim 3 in which the non-metallic element is provided with a metallic cap and one of the parts includes a recess receiving said cap and holding it and said element against movement lengthwise of the part but accommodating rotation of the cap and element whereby the strut may be rotated in the plane of the beam to accommodate a brake lever inclined to either side of a perpendicular to the beam.

6. In a strut for a truss type brake beam, a rigid body including a part for opposing a face of a beam compression member, an element associated with said part and formed of non-metallic distortable material arranged for contact with the beam compression member, and means for thrusting said part and member towards each other and thereby distorting said material to hold the strut against movement along the compression member.

7. A strut as described in claim 6 in which the non-metallic element includes a shank extending through a portion of the strut body and having a head for maintaining the assembly of the element and the strut body.

8. A strut as described in claim 6 which includes a loop portion for receiving the beam compression member and accommodating relative rotation of the strut and beam to render the strut reversible for left hand and right hand inclination of a brake lever mounted in the strut, the face of the strut loop arranged to oppose the beam compression member having a circular recess centered about the longitudinal axis of the strut, and the distortable element being provided with a metallic cup-like cap seated in said recess and accommodating relative rotation of the strut and element.

9. In a strut for a truss type brake beam, a strut body including integral parts for opposing opposite sides of a beam compression member, a thrust-receiving element of readily distortable non-metallic material applied to one of said parts to engage one side of the beam compression member, and a wedge device for insertion between the other of said parts and the other side of the beam compression member.

10. A strut as described in claim 9 which includes a separately formed metallic cap between the thrust-receiving element and the adjacent body part, and means holding said cap against movement transversely of the body part but accommodating rotation of said cap, element and body, relative to the beam compression member, to adapt the strut for mounting a lever inclined either to the left or to the right of a perpendicular to the plane of the beam.

11. In a strut for a truss type brake beam, a strut body including integral parts for opposing opposite sides of a beam compression member, a thrust-receiving element of readily distortable non-metallic material applied to one of said parts to engage one side of the beam compression member, and a wedge device for insertion between the other of said parts and the other side of the beam compression member, said strut including elements for engaging respectively the upwardly and downwardly facing surfaces of a compression member of channel section or of a compression member of relatively shallower U section to limit the relative rotation of the strut and compression member.

12. In a strut for a truss type railway brake beam, a loop portion adapted to receive selectively a beam compression member of U cross section or a compression member of channel cross section the depth of which, over its flanges, is greater than the corresponding depth of the U section member, said loop portion having elements arranged to engage the outer faces of the flanges of the channel section member to limit the rotation of the strut in the plane of the beam, there being a part projecting from one side of said loop portion adapted to extend between the flanges of the U section member and engage their inner faces to limit the rotation of the strut in the plane of the beam, said elements and part being arranged to avoid interference with the U section member and channel section member respectively in the rotation of the strut between positions in which it accommodates inclination of the brake lever at different sides of the perpendicular to the beam.

13. In a truss type brake beam assembly, a strut, a beam compression member receiving said strut, said strut being rotatable in the plane of the beam from a position in which it is disposed to hold a brake lever to a given angle at one side of a perpendicular to the beam, to a position in which it is disposed to hold the lever inclined at the same angle at the other side of the perpendicular, said strut being arranged to receive selectively another compression member having a cross section differing in shape and over-all dimensions from said first mentioned member, said strut having fixed elements disposed to engage respectively the horizontal faces of the selected compression member to limit the rotation of the strut to the desired inclination at both sides of the perpendicular.

14. In a truss type brake beam, a compression member of channel cross section, a strut body including a slot for receiving the brake lever and having a loop portion encircling said compression member, means providing a pivot bearing for one wall of said loop portion on the opposing face of said compression member, and the upper and lower elements of said loop portion being shaped to limit the rotation of said strut about its pivot bearing from an inclination of the brake lever at one side of a perpendicular to the beam to an inclination of the lever at the other side of the perpendicular, the other wall of the loop portion having a boss extending between the flanges of said compression member and clearing the same irrespective of the rotation of the strut as described but shaped to limit the rotation of the strut when the latter is applied to a compression member having flanges so close together that said elements on the loop portion will not engage the member sides so as to hold it in desired angular position.

15. In a strut for a truss type brake beam, a rigid body including a part for opposing a face of a beam compression member, an element associated with a portion of said part and formed of non-metallic distortable material arranged for contact with a beam compression member to prevent sliding of the strut along the member, there being a seat of rigid material for said element rotatably but non-slidably mounted on said part, thereby rendering the strut reversible in its relation to the beam compression member to accommodate inclination of a brake lever mounted in the strut to opposite sides of a perpendicular to the plane of the beam.

EDWIN G. BUSSE.